3,025,246
DEFLOCCULANT COMPOSITION
Luther J. Reid, Jr., West Deptford Township, Gloucester County, N.J., assignor to Socony Mobil Oil Company, Inc., a corporation of New York
No Drawing. Filed July 22, 1959, Ser. No. 828,724
14 Claims. (Cl. 252—455)

This invention is directed to an improved deflocculant formulation and more particularly is concerned with a method for inhibiting the flocculation of particles of finely divided alumina in a slurry of the same in aqueous alkali metal silicate.

In the manufacture of certain solid porous siliceous products including for example, adsorbents, catalysts, catalyst supports, contacting agents and the like, it has heretofore been found desirable to initially prepare a slurry of finely divided alumina in an aqueous alkali metal silicate solution and to subsequently effect gelation of the alkali metal silicate containing suspended pulverized alumina. In carrying out such operation, it has been observed that the fine particles of alumina have a tendency to agglomerate into clusters in the silicate solution. The siliceous gel product obtained from a slurry in which alumina particles have undergone agglomeration into large clusters has been found to be characterized by an undesired low resistance to attrition.

One of the outstanding physical attributes of a commercial siliceous adsorbent or catalyst is hardness, i.e. the ability to resist attrition. The ability of a particle to hold its shape in withstanding the mechanical handling to which it is subjected upon storage, shipment and use is a primary requirement for a successful product of this type and for modern processes utilizing the same. Thus, catalytic cracking operations in which heavy petroleum fractions are converted to lighter materials boiling in the range of gasoline are carried out in the presence of a solid porous catalyst and generally a composite of silica-alumina which may contain a minor proportion of one or more added metals or metal oxides. These catalytic processes are generally advantageously carried out employing methods wherein the catalyst or contact mass is subjected to continuous handling. In such operations, a continuously moving stream of hydrocarbon feed is contacted with a continuously moving stream of catalyst for the accomplishment of conversion and thereafter the catalytic material is continuously regenerated and returned to the conversion zone. This contiuous handling and regeneration of the catalyst particles results in considerable breakage and constant abrasion, consuming the catalyst and giving rise to an excessive amount of fines which are a loss since they generally cannot be re-used in the same catalytic equipment. Furthermore, there is a tendency for the catalyst fines suspended in the gas or vapor present to act as an abrasive in a manner analogous to sand blasting. This not only wears away the equipment but also causes the catalyst to take up foreign material detrimental to its catalytic properties. A hard, porous contact material having the ability to withstand abrasion during the necessary handling involved during continual conversion and regeneration, is definitely desirable in overcoming the aforementioned disadvantages.

It is accordingly the principal object of the present invention to provide means for preventing agglomeration of pulverized alumina in aqueous alkali metal silicate and to thereby overcome the poor resistance to attrition of the resulting gel product. A further object of the invention is the provision of a deflocculant formulation capable of effecting a marked reduction in flocculation of particles of finely divided alumina in aqueous alkali metal silicate solution. A still further object is to afford a method for maintaining pulverized alumina in a deflocculated state in the presence of aqueous alkali metal silicate.

The above and other objects which will be apparent to those skilled in the art are achieved in accordance with the present invention. In one embodiment, the present invention comprises a method for inhibiting flocculation of a slurry of finely divided alumina in aqueous alkali metal silicate solution by the addition thereto of a small amount of a formulation consisting essentially of a 10:1 to 1:10 weight ratio of an alkali metal dichromate and a material selected from the group consisting of a water-soluble high molecular weight carboxy polymethylene and a water-soluble high molecular weight carboxy polysaccharide. In another embodiment, the invention comprises an improved deflocculant consisting essentially of the aforesaid formulation. In a specific embodiment, the present invention comprises an improvement in the manufacture of a high density silica-alumina cracking catalyst prepared by dispersing in an alkali metal silicate solution finely divided alpha alumina which has undergone previous calcination at a temperature in excess of 2000° F. and which has a weight mean particle diameter of between about 2 and about 7 microns, and between about 0.02 and about 1 percent by weight based on the amount of finely divided alumina of a deflocculant formulation consisting essentially of a 10:1 to 1:10 weight ratio of an alkali metal dichromate and a material selected from the group consisting of a water-soluble high molecular weight carboxy polymethylene and a water-soluble high molecular weight carboxy polysaccharide. An aluminum compound, such as acidic aluminum sulfate or sodium aluminate is then intimately admixed with the alkali metal silicate slurry to yield a silica-alumina sol containing, on a dry basis, a major proportion of silica and a minor proportion, generally between about 7 and about 40 percent by weight, of cogelled alumina, the amount of finely divided alumina corresponding to between about 20 and about 45 percent by weight of the resulting dry composite. The concentrations and proportions of reactants are such that the resulting silica-alumina sol, after a suitable interval of time sets to a hydrogel which is thereafter wet processed, dried and calcined to yield a highly attrition resistant catalyst.

Because of the good stability of catalysts containing high cogelled alumina, it is desirable to have a high alumina content, i.e. greater than about 10 weight percent, in the gel surrounding the alumina particles. Increasing the cogelled alumina may be done in one of two ways. First the aluminum salt content, for example aluminum sulfate of the acidic aluminum sulfate solution may be increased. Secondly, the slurry of finely divided alumina in aqueous alkali metal silicate may be gelled by mixing with a solution of alkali metal aluminate. In both instances, increasing the cogelled alumina content in the presence of finely divided alumina produces a gel in which particles are more severely agglomerated.

The finely divided alumina dispersed in aqueous alkali metal silicate solution in accordance with the method of the invention may be any of the various phases of alumina such as for example, gamma, eta, alpha, chi alumina or a combination thereof. The alumina may be naturally occurring or may be synthesized by any of conventional methods well known in the art. One type of alumina which has been found to be especially applicable for dispersion in aqueous alkali metal silicate, used in preparation of a silica-alumina catalyst, is alpha alumina which has undergone previous calcination at a temperature in excess of 2000° F. such that the surface area normally present at low temperature is largely destroyed. Alcoa A–2 alumina ts a particularly effective form of alumina fulfilling the above requirements. Such alumina is characterized by a hexagonal crystalline structure and has the following properties.

Chemical analysis, percent:

| | |
|---|---:|
| $Al_2O_3$ | 99 |
| $Na_2O$ | 0.50 |
| $Fe_2O_3$ | 0.04 |
| $SiO_2$ | 0.025 |
| Loss on ignition, 1100° C. | 0.30 |
| Water adsorbed at 50% humidity | 0.10 |
| Alpha alumina content, percent | 90+ |

Physical properties:

| | |
|---|---:|
| Bulk density, packed, lb./ft.$^3$ | 68 |
| Bulk density, loose, lb./ft.$^3$ | 52 |
| Specific gravity | 3.7–3.9 |
| Surface area, m.$^2$/g. | 0.4 |
| Pore volume, ml./g. | 0.25 |
| Pore diameter, A | 15,000 |

The particle size of the pulverized alumina is generally within the approximate range of 2 to 7 microns in weight mean particle diameter. The amount of finely divided alumina dispersed in the aqueous alkali metal silicate solution is ordinarily such that the content of such alumina in the resulting slurry is between about 1 and about 15 percent by weight.

The alkali metal silicate solution in which the pulverized alumina is suspended is generally sodium silicate but it is contemplated that other alkali metal silicates such as potassium silicate may, likewise, be used. The alkali metal oxide to silica weight ratio of the alkali metal silicate, for example, in sodium silicate, the $Na_2O/SiO_2$ ratio may, in accordance with the process described herein, vary widely depending on the particular brand of sodium silicate employed. Thus, in commercial "N" brand sodium silicate solution the weight ratio $Na_2O/SiO_2$ is about 0.31. The concentration of alkali metal silicate solutions employed is generally such that the silica content thereof is between about 5 and about 50 and more particularly between about 10 and about 30 percent by weight.

The deflocculating agent of the present invention found to be particularly applicable and effective in preventing flocculation of the above described pulverized alumina in aqueous alkali metal silicate solution is a formulation consisting essentially of a 10:1 to 1:10 weight ratio of (1) an alkali metal dichromate and (2) a water-soluble high molecular weight carboxy polymethylene or carboxy polysaccharide. The latter component is characterized by substantially complete solubility in water under the temperature conditions employed, by a molecular weight in excess of about 350, and by the presence of one or more carboxy groups in the molecular structure. Typical carboxy polysaccharides useful in the present formulation include alginates, such as sodium alginate; carboxy alkyl celluloses, such as sodium carboxy-methylcellulose; modified starches, such as dextrin and also derivatives of the carbohydrates, such as pectins and pectic acids; the gums, such as gum arabic and similar materials which are hydrolyzable to pentose or hexose sugars or hexuronic acids or similar carbohydrates. Carboxy polymethylenes useful in the present formulation likewise are characterized by substantially complete solubliity in water under the temperature conditions employed, by a molecular weight in excess of about 350 and by the presence of one or more carboxy groups. It is contemplated that carboxy polymethylenes having the above characteristics are generally useful in the present deflocculant formulation. Representative carboxy polymethylenes are polyacrylic acid and polymethacrylic acid. Commercially available polyacrylic acids include, for example, "Carbopol 934" marketed by B. F. Goodrich Company. The alkali metal dichromate employed is generally sodium dichromate ($Na_2Cr_2O_7.2H_2O$) but it is contemplated that other alkali metal dichromates, such as potassium dichromate, may likewise be used. It has been found that the combination of an alkali metal dichromate with the hereinabove described water-soluble high molecular weight carboxy polymethylene or carboxy polysaccharide increased the deflocculating power of the latter for pulverized alumina in aqueous alkali metal silicate by decreasing the quantity of such material required. It has further been observed that, in some cases, a combination of alkali metal dichromate with carboxy polymethylene or carboxy polysaccharide resulted in an effective deflocculant formulation even though neither component per se showed any deflocculating power. It would accordingly appear that the combination of the two hereinabove components making up the present deflocculant formulation possesses a synergistic deflocculating power.

The problem of flocculation of pulverized alumina in aqueous alkali metal silicate appears to be a function of both the alumina and the silicate. Thus, such problem is not prevalent when a siliceous powder, for example a clay or a finely divided silica-alumina gel comprising a major proportion of silica and a minor proportion of alumina is suspended in alkali metal silicate solution. The siliceous powder, in contradistinction to pulverized alumina, remains dispersed as individual particles in the alkali metal silicate slurry. Gel formed from such slurry contains the siliceous powder uniformly dispersed throughout the gel product, which has been found to possess good attrition resistance. Without being limited by any theory, the significant difference in behavior of finely divided siliceous material and alumina in this regard is believed to be due, at least in part, to the fact that particles such as silica and clay, are charged negatively by adsorption of silicate or hydroxy anions from the solution. Particles in certain other suspensions and colloidal solution, such as aqueous colloidal dispersion of hydrous alumina, adsorb hydrogen ions or other cations from solution and become positively charged. Assuming the particles of finely divided alumina are positively charged, it may be postulated that one end of a silicate chain in the silicate solution was adsorbed to one alumina particle by electrostatic attraction while another particle was adsorbed to the same silicate chain also by electrostatic attraction causing flocculation. The problem of flocculation of a slurry of finely divided alumina in water likewise is not encountered indicating that the presence of alkali metal silicate is a factor in the agglomeration of the alumina powder. This has been substantiated by the observation that the addition of sodium silicate solution to an aqueous slurry of finely divided alumina resulted in flocculation of the alumina particles.

When a slurry is deflocculated, the settling of the individual particles proceeds with packing of the particles into a sediment with maximum efficiency. Thus, the sedimentation cake volume obtained on settling a deflocculated slurry is lower than that obtained by settling a flocculated slurry of equal solids content. When given weights of the same solid material are settled from the same solution in identical vessels, the deflocculated material settles into the smallest volume and therefore will have the highest cake density. The high density that is characteristic of a cake of deflocculated particles may be advantageously used to evaluate the effectiveness of deflocculant formulations.

The general procedure utilized in evaluation of the deflocculant compositions of the present invention involved the formation of a slurry of a given weight of pulverized alumina in aqueous sodium silicate solution into which the deflocculating agent had been incorporated. The slurry was allowed to settle until the cake volume no longer changed with time. The density of this cake is the equilibrium cake density. The higher the equilibrium cake density, the greater is the degree of deflocculation and the more effective is the deflocculant formulation.

The detailed evaluation procedure employed was as follows: About one-half of a gram of the deflocculant formulation undergoing test was dissolved in 65 grams of water. To this solution was added 16 grams of alumina (Alcoa A-2) powder having a weight mean particle diameter of approximately 4.6 microns. The resulting slurry was rapidly mixed with agitation for one minute. One hundred forty-two (142) grams of a silicate solution composed of 55 percent by weight of "N" brand sodium silicate and 45 percent by weight of water was then added to the slurry. The mixed solutions were then rapidly agitated for three minutes. After mixing, 100 ml. of the slurry was poured into a 100 ml. graduate. The slurry in the graduate was permitted to stand until the equilibrium sedimentation volume of the solid particles was obtained. Approximately 24 hours was sufficient time for attainment of the equilibrium sedimentation volume for the cake. The density of this cake was then determined. After 24 hours the small quantity of solids in suspension was insufficient to effect the calculated equilibrium cake density.

The results obtained upon testing various formulations in the above manner are set forth in the table below:

TABLE I

*Deflocculant Formulations for a Slurry Containing 5% (Weight) Alpha Alumina Powder,[1] 53.7% Water and 41.3% "N" Brand Sodium Silicate Solution [2]*

| Ex. | Deflocculant | Weight percent deflocculant based on finely divided alumina | Density of cake formed (g./cc.) in settling 100 ml. of slurry |
|---|---|---|---|
| 1 | Sodium alginate | 0.05 | 2.2 |
|   | Sodium dichromate | 0.15 |  |
| 2 | Dextrin | 0.10 | 2.2 |
|   | Sodium dichromate | 0.075 |  |
| 3 | Sodium carboxymethylcellulose | 0.025 | 2.0 |
|   | Sodium dichromate | 0.15 |  |
| 4 | Polyacrylic acid (Carbopol 934) | 0.025 | 2.0 |
|   | Sodium dichromate | 0.15 |  |
| 5 | Sodium alginate | 1.0 | 1.7 |
| 6 | Gum arabic | 2.5 | 1.5 |
| 7 | Polyacrylic acid (Carbopol 934) | 0.06 | 1.5 |
| 8 | Dextrin | 0.1 | [3]<1.5 |
|   |  | 2.5 | [3]<1.5 |
| 9 | Sodium carboxymethylcellulose | 1.0 | [3]1.0 |
|   |  | 2.5 | [3]1.1 |
|   |  | 0.25 | [3]1.2 |
| 10 | Sodium dichromate | 1.5 | [3]1.0 |
|   |  | 0.15 | [3]1.0 |
|   |  | 0.05 | [3]1.1 |

[1] Weight mean particle diameter of 4.6 microns.
[2] "N" brand sodium silicate solution contains 8.9% weight Na$_2$O, 28.7% weight SiO$_2$, and 62.4% weight H$_2$O.
[3] Flocculated.

It will be seen from the foregoing results that the formulations comprising a combination of sodium dichromate, with a carboxy polysaccharide or carboxy polymethylene unexpectedly afforded a composition of enhanced deflocculating power. It will further be seen that despite the fact that neither sodium dichromate nor certain of the carboxy polysaccharides such as dextrin and sodium carboxymethylcellulose was effective in preventing flocculation of the particles of finely divided alumina in the aqueous sodium silicate solution, the combination thereof prove to be a highly effective deflocculant. The action of sodium dichromate is not known but is likely that the same upon contact with the alkaline sodium silicate undergoes conversion to sodium chromate and that a complex anion forms consisting of a chromate ion and a carboxylic group, with the chromate portion of the complex being adsorbed to a negatively charged surface.

It is to be understood, however, that the above description is merely illustrative of preferred embodiments of the invention, of which many variations may be made by those skilled in the art without departing from the spirit thereof.

I claim:

1. In the preparation of a slurry containing between about about 1 and about 15 percent by weight of finely divided alumina having a weight mean particle diameter of between about 2 and about 7 microns in an aqueous alkali metal silicate solution of such concentration that the silica content thereof is between about 5 and about 50 percent by weight, the improvement which comprises inhibiting flocculation of said finely divided alumina by the inclusion in said slurry of between about .02 and about 1 percent by weight based on the amount of said alumina of a composition consisting essentially of a 10:1 to 1:10 weight ratio of an alkali metal dichromate and a material characterized by substantially complete solubility in water and a molecular weight in excess of 350 selected from the group consisting of a carboxy polymethylene and a carboxy polysaccharide.

2. A method for inhibiting flocculation of a slurry of finely divided alumina in aqueous alkali metal silicate solution which comprises the inclusion therein of a minor proportion of a composition consisting essentially of a 10:1 to 1:10 weight ratio of an alkali metal dichromate and a material characterized by substantially complete solubility in water and a molecular weight in excess of 350 selected from the group consisting of a carboxy polymethylene and a carboxy polysaccharide.

3. A method for inhibiting flocculation of a slurry of alpha alumina which has undergone previous calcination at a temperature in excess of 2000° F. and which has a weight mean particle diameter of between about 2 and about 7 microns in aqueous alkali metal silicate solution which comprises the inclusion in said slurry of a 10:1 to 1:10 weight ratio of an alkali metal dichromate and a material characterized by substantially complete solubility in water and a molecular weight in excess of 350 selected from the group consisting of a carboxy polymethylene and a carboxy polysaccharide.

4. In the preparation of a slurry containing between about 1 and about 15 percent by weight of finely divided alpha alumina which has undergone previous calcination at a temperature in excess of 2000° F. and which has a weight mean particle diameter of between about 2 and about 7 microns in an aqueous sodium silicate solution of such concentration that the silica content thereof is between about 5 and about 50 percent by weight, the improvement which comprises inhibiting flocculation of said finely divided alumina by the inclusion in said slurry of between about .02 and about 1 percent by weight, based on the amount of said alumina, of a composition consisting essentially of a 10:1 to 1:10 weight ratio of an alkali metal dichromate and a material characterized by substantially complete solubility in water and a molecular weight in excess of 350 selected from the group consisting of a carboxy polymethylene and a carboxy polysaccharide.

5. In the preparation of a slurry containing between about 1 and about 15 percent by weight of finely divided alpha alumina which has undergone previous calcination at a temperature in excess of 2000° F. and which has a weight mean particle diameter of between about 2 and about 7 microns in an aqueous sodium silicate solution of such concentration that the silica content thereof is between about 5 and about 50 percent by weight, the improvement which comprises inhibiting flocculation of said finely divided alumina by the inclusion in said slurry of between about .02 and about 1 percent by weight, based on the amount of said alumina of a composition consisting essentially of a 10:1 to 1:10 weight ratio of sodium dichromate and sodium alginate.

6. In the preparation of a slurry containing between about 1 and about 15 percent by weight of finely divided alpha alumina which has undergone previous calcination at a temperature in excess of 2000° F. and which has a weight mean particle diameter of between about 2 and about 7 microns in an aqueous sodium silicate solution of such concentration that the silica content thereof is between about 5 and about 50 percent by weight, the improvement which comprises inhibiting flocculation of said finely divided alumina by the inclusion in said slurry of between about .02 and about 1 percent by weight, based on the amount of said alumina of a composition consisting essentially of a 10:1 to 1:10 weight ratio of sodium dichromate and dextrin.

7. In the preparation of a slurry containing between about 1 and about 15 percent by weight of finely divided alpha alumina which has undergone previous calcination at a temperature in excess of 2000° F. and which has a weight mean particle diameter of between about 2 and about 7 microns in an aqueous sodium silicate solution of such concentration that the silica content thereof is between about 5 and about 50 percent by weight, the improvement which comprises inhibiting flocculation of said finely divided alumina by the inclusion in said slurry of between about .02 and about 1 percent by weight, based on the amount of said alumina of a composition consisting essentially of a 10:1 to 1:10 weight ratio of sodium dichromate and sodium carboxymethylcellulose.

8. In the preparation of a slurry containing between about 1 and about 15 percent by weight of finely divided alpha alumina which has undergone previous calcination at a temperature in excess of 2000° F. and which has a weight mean particle diameter of between about 2 and about 7 microns in an aqueous sodium silicate solution of such concentration that the silica content thereof is between about 5 and about 50 percent by weight, the improvement which comprises inhibiting flocculation of said finely divided alumina by the inclusion in said slurry of between about .02 and about 1 percent by weight, based on the amount of said alumina of a composition consisting essentially of a 10:1 to 1:10 weight ratio of sodium dichromate and polyacrylic acid.

9. A deflocculant composition consisting essentially of a 10:1 to 1:10 weight ratio of an alkali metal dichromate and a material characterized by substantially complete solubility in water and a molecular weight in excess of 350 selected from the group consisting of a carboxy polymethylene and a carboxy polysaccharide.

10. A deflocculant composition consisting essentially of a 10:1 to 1:10 weight ratio of sodium dichromate and a material characterized by substantially complete solubility in water and a molecular weight in excess of 350 selected from the group consisting of a carboxy polymethylene and a carboxy polysaccharide.

11. A deflocculant composition consisting essentially of a 10:1 to 1:10 weight ratio of sodium dichromate and sodium alginate.

12. A deflocculant composition consisting essentially of a 10:1 to 1:10 weight ratio of sodium dichromate and dextrin.

13. A deflocculant composition consisting essentially of a 10:1 to 1:10 weight ratio of sodium dichromate and sodium carboxymethylcellulose.

14. A deflocculant composition consisting essentially of a 10:1 to 1:10 weight ratio of sodium dichromate and polyacrylic acid.

References Cited in the file of this patent
UNITED STATES PATENTS

| | | |
|---|---|---|
| 2,856,366 | Novak et al. | Oct. 14, 1958 |
| 2,900,349 | Schwartz | Aug. 18, 1959 |